Oct. 10, 1961     F. A. EHLERS     3,003,845
DYE-RECEPTIVE POLYMER COMPOSITIONS OF FIBER-FORMING POLYMERS
AND CROSS-LINKED N-VINYL-3-MORPHOLINONE
COPOLYMERS, PREPARATION THEREOF AND
ARTICLES RESULTING THEREFROM
Filed April 16, 1958
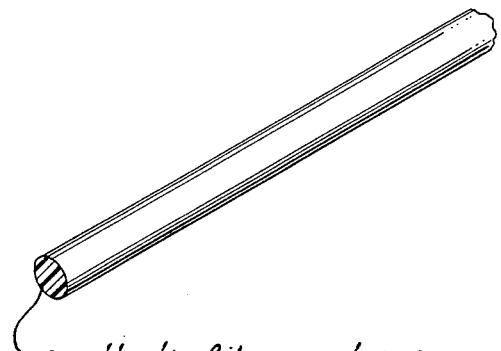
Synthetic fiber containing water-insoluble N-vinyl-3-morpholinone polymer as a dye-assisting adjuvant.
INVENTOR.
Forrest A. Ehlers
BY Jerome Rudy
ATTORNEY

United States Patent Office 3,003,845
Patented Oct. 10, 1961

3,003,845
DYE-RECEPTIVE POLYMER COMPOSITIONS OF FIBER-FORMING POLYMERS AND CROSS-LINKED N-VINYL-3-MORPHOLINONE COPOLYMERS, PREPARATION THEREOF AND ARTICLES RESULTING THEREFROM
Forrest A. Ehlers, Walnut Creek, Calif., assignor to The Dow Chemical Company, Midland, Mich., a corporation of Delaware
Filed Apr. 16, 1958, Ser. No. 728,866
20 Claims. (Cl. 8—100)

This invention relates to improved dye-receptive polymer compositions that comprise synthetic, linear, hydrophobic polymers and that contain certain copolymers of N-vinyl-3-morpholinones, particularly unsubstituted N-vinyl-3-morpholinone (hereinafter generically and specifically referred to as NVM and VM, respectively), as dye-assisting adjuvants that are insoluble in water. It also has reference to a method for preparing such compositions, particularly those comprising acrylonitrile polymers, and to the shaped articles, especially fibers, films and the like, that may be advantageously provided by practice of the present invention.

Many of the polymers and copolymers that are comprised of NVM monomers are attributed with a pronounced capacity for accepting a wide variety of dyestuffs. As a consequence, it is beneficial to employ such polymeric materials as dye-assisting adjuvants in synthetic polymeric compositions that may ordinarily be difficult to dye in order to enhance the dye-receptive properties of such compositions. This practice has been particularly advantageous with various fiber-forming acrylonitrile polymer compositions, especially polyacrylonitrile and certain difficultly dyeable acrylonitrile copolymers.

Although the utilization of NVM polymeric materials in this manner is desirable, the conventional NVM polymers and copolymers, particularly those with VM, are quite susceptible to become disolved in water. As can easily be appreciated, such a characteristic may diminish the complete advantage that might otherwise be secured by their employment as dye-assisting adjuvants in various compositions with other polymeric materials. Dissatisfactory results may be especially manifest when the compositions are fiber-forming, as are many of the acrylonitrile polymer compositions, and are fabricated into such shaped articles as fibers and the like, including cloth and fabric constructed therefrom, which are commonly subjected to the extractive influence of water whenever they are washed, scoured or laundered during their manufacture or in the course of their useful life as a textile article, or both.

As may be apparent, one of the undesirable consequences of employing a water-soluble dye-assisting adjuvant in fiber-forming polymeric compositions is to require that a sufficiently large quantity of the additament be incorporated in the composition to ensure that the shaped articles, particularly textile fibers, prepared from such composition may have an accetable dye-receptivity despite dissolution losses of the adjuvant that may be encountered prior to dyeing the shaped article. The dissolution losses of many water-soluble additaments from textile fibers and the like may be considerable. Under some circumstances, for example, as much as 30 to 40 percent by weight of the water-soluble N-vinyl-3-morpholinone polymer that is employed as a dye-assisting adjuvant in fibers from acrylonitrile and other polymer compositions may be lost when the fibers are scoured or subject to other aqueous exposures.

Frequently the quantities of the adjuvant that must be employed to compensate for dissolution losses are so large as to deleteriously influence the properties of the composition in which they are incorporated. Sometimes, by way of illustration, fibers that are prepared from a composition that contains as much as 15 or 20 percent by weight of certain additament ingredients, based on the weight of the fiber-forming constituents in the composition, may have some of their desirable physical properties, such as wet strength, reduced by as much as half in comparison to fibers prepared from the same composition without the inclusion of additaments. Another difficulty that may be encountered when employing water-soluble dye-assisting adjuvants in polymeric fiber-forming compositions is to impart poor washfastness to the dyed shaped articles that may be prepared from the compositions.

It would be advantageous, and it is among the principal objects of the present invention, to provide improved dye-receptive compositions comprised of synthetic, linear, hydrophobic polymers that contain certain NVM copolymers, particularly VM copolymers, as dye-assisting adjuvants that are insoluble in water. Such compositions could be provided with minimum incorporated quantities of the adjuvant and shaped articles prepared therefrom would be less susceptible to loss of the incorporated adjuvant upon exposure to water. It would also be advantageous, and it is also among the objects of the invention, to provide methods for preparing such compositions, particularly acrylonitrile polymer compositions, and to furnish the shaped articles, especially fibers, films and the like, that are made available by practice of the invention.

To the attainment of these and related ends, an improved dye-receptive synthetic, linear, hydrophobic polymer composition is comprised of a synthetic, linear, hydrophobic polymer, preferably a fiber-forming polymer or copolymer, in which there has been incorporated an NVM, advantageously a VM, copolymer that has a cross-linked molecular configuration so as to be insoluble in water. The improved dye-receptive compositions of the invention may be provided by incorporating the cross-linked NVM copolymer in the synthetic, linear, hydrophobic polymer composition prior to its fabrication into a shaped article or, in many cases, by impregnation of a shaped article of the synthetic polymer after its extrusion or fabrication with a beneficial quantity of the cross-linked NVM polymer. Shaped articles prepared from the improved synthetic polymer compositions of the present invention, one of which is represented in the accompanying drawing, have exceptional receptivity for a wide variety of dyestuffs and, in addition, are not prone to lose appreciable quantities of the incorporated dye-assisting adjuvant upon being exposed or subjected to water, even under severe extractive conditions. The invention may be practiced with any desired synthetic, linear, hydrophobic polymer. Advantageously, it may be practiced with fiber-forming polymeric compositions. It is especially beneficial to practice the invention with acrylonitrile polymer compositions and other difficultly dyeable synthetic polymeric materials.

The water-insoluble, dye-assisting NVM copolymer that is employed in the practice of the invention may be a copolymer of an N-vinyl-3-morpholinone monomer and a cross-linking polyfunctional monomeric material. It may frequently be more desirable, as has been indicated, to utilize a cross-linked copolymer of non-ring substituted N-vinyl-3- morpholinone (VM) and a polyfunctional monomeric material as the dye-assisting adjuvant in the practice of the invention.

Many polyfunctional monomeric materials may be employed for providing the cross-linked copolymers that are utilized in the practice of the present invention. In general, such polyfunctional monomers may be characterized in having a plurality of at least two ethylenically unsaturated units (which frequently are vinyl groups) and in being copolymerizable with NVM monomers. The latter feature, incidentally, may be easily determined by relatively simple and readily apparent testing by means that will be obvious to those who have the skill of their calling.

Typically representative of the polyfunctional monomers that may be used in the practice of the present invention are those set forth in the following tabulations which are intended to be illustrative and not limiting and to fully imply the close equivalent homologues and isomers of the indicated compounds:

*Table A.—Vinyl-containing hydrocarbons*
   Divinyl benzene
   1,5-dipentadiene

*Table B.—Ethylenically unsaturated polyalcohols*
   Diallyl glycerol
   Diallyl sorbitol
   Diallyl pentaerithritol
   Diethylene glycol divinyl ether

*Table C.—Acrylic and methacrylic acid derivatives*
   Alkylene and alkylidene-bis-acrylamides
   Ethylene diacrylate
   Allyl acrylate
   Polyalkylene glycol diacrylates

*Table D.—Ethylenically unsaturated esters of polybasic acids or pseudo acids*
   Diallyl adipate
   Diallyl maleate
   Diallyl fumarate
   Triallyl cyanurate
   Triallyl isocyanurate

*Table E.—Others*
   Vinyl crotonate
   Diethyleneglycol-bis-allyl-carbonate
   Diallylbenzene phosphonate
   2,4-diallyloxy-6-amino-5-triazine
   Triacrylylperhydrotriazine Frequently, polyfunctional monomers of the type set forth in Tables C and D are more advantageous to employ. It is oftentimes of most benefit to use a dye-receptive, water-insoluble, cross-linked copolymer of the indicated variety that contains as the polyfunctional monomeric ingredient or constituent one that has been selected from the group consisting of methylene-bis-acrylamide, divinyl benzene, diallyl glycerol, tetraethyleneglycol dimethacrylate, triallyl cyanurate, triacrylylperhydrotriazine or their mixtures.

The NVM monomers that are used for preparation of the dye-receptive, water-insoluble, cross-linked copolymeric products are of the general structure:

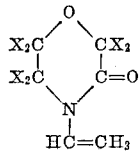

(I)

wherein each X is independently selected from the class consisting of hydrogen, alkyl radicals containing from 1 to about 4 carbon atoms, and aryl radicals containing from 6 to about 10 carbon atoms. Typical of such monomers, besides the highly desirable VM (i.e., wherein all of the X substituents in formula (I) are hydrogen), are N-vinyl-5-methyl-3-morpholinone, N-vinyl-2-methyl-3-morpholinone, N-vinyl-4-methyl-3-morpholinone, N-vinyl-5-ethyl-3-morpholinone, N-vinyl-5-phenyl-3-morpholinone and the like. Morpholinone compounds, with less precision, may sometimes be referred to as morpholones.

The constitution of the copolymers that may be employed satisfactorily depends to a great extent upon the nature of the polyfunctional monomeric ingredient that is utilized. If, for example, the cross-linking monomer has a dye-receptive nature, as in the case of methylenebis-acrylamide and its close homologues, it may be satisfactory for the copolymer to contain between about 2 and 98 percent by weight of the NVM monomer polymerized in the copolymer molecule. Usually, however, it is suitable for the copolymer to contain predominant proportions, as at least 60 percent by weight, of the NVM monomer and it is frequently advantageous for the NVM content of the cross-linked copolymer molecule to be from about 80 to 98 percent by weight. In many instances it may be desirable for the copolymer to contain in the neighborhood of 90 percent by weight of the NVM monomer polymerized in the copolymer molecule. The dye-receptive copolymers are generally white or light colored products that are also insoluble in practically all salt solutions and organic solvents.

The cross-linked NVM polymers that are employed in the practice of the present invention may be prepared by copolymerizing the NVM monomer with the polyfunctional cross-linking monomer at an elevated temperature under basic conditions in an aqueous medium with the assistance of a suitable catalyst such as a peroxy type polymerization catalyst. Thus, the NVM polymers, particularly VM, may generally be obtained by dispersing the monomeric materials that are to be copolymerized in water containing a sufficient quantity of ammonium hydroxide to provide a pH of between about 6 and 12 in the reaction mass. The copolymer product may be obtained under such basic conditions by assisting the polymerization with a hydrogen peroxide or potassium persulfate catalyst. While temperatures between about 20° C. and the boiling point may be suitable for the polymerization of the copolymers, it is ordinarily satisfactory to conduct the reaction at a temperature of about 50 to 80 or 100° C. Usually, depending upon the specific factors that may be involved, the copolymerization may be accomplished satisfactorily within a time period of about 10 to 60 hours.

The polymerization system that is employed for the preparation of the copolymers employed in the present invention may consist of as much as 50 percent by weight of the monomers to be polymerized in the aqueous medium. The amount of monomeric material that is provided in the copolymerization system may be influenced somewhat by the manner in which it is intended to incorporate the product in the synthetic polymer compositions in order to provide the compositions of the invention.

If, for example, it is intended to incorporate the copolymer products by blending into a fiber forming composition prior to its fabrication into shaped articles, the copolymerization system may, if desired, contain about equal proportions by weight of the charged monomeric materials and the aqueous polymerization medium. In such cases, the copolymer product may ordinarily be obtained as a gel (particularly when the polymerization has been accomplished without agitation) that, after being dried and isolated from unreacted monomer, may be incorporated in the fiber-forming composition.

If the incorporation of the dye-assisting NVM copolymer adjuvant in a fiber-forming composition is to be achieved by impregnation therewith of an already-formed shaped article of the composition, it may be desirable to effect the polymerization so as to directly form the polymerization system as a suitable applicating emulsion or suspension of the dye-assisting polymeric product. For such purposes, the polymerization system may be prepared to contain as little as 5 or 10 percent by weight of the polymerizing monomeric ingredients. Preferably, such a polymerization may be conducted under the influence of vigorous agitation to facilitate preparation of an emulsified product. It may also be beneficial under such circumstances to incorporate a dispersant or emulsifying agent in the polymerization system to facilitate obtaining a stable and homogeneous emulsified product. Such a method for preparing the dye-assisting NVM polymers that are employed in the present invention may be especially appropriate when they are intended to be applied to acrylonitrile ploymer fibers and the like that are derived from aquagels in the course of their manufacture, such as the acrylonitrile polymer fibers that are wet spun from aqueous saline solutions of the fiber-forming polymer, or to fibers from other synthetic polymers that are in a swollen or gel condition during their preparation.

In such instances, the emulsified, water-insoluble, dye-assisting NVM copolymer may be impregnated into the fiber while it is in a swollen or gel condition, as an acrylonitrile polymer fiber in an aquagel condition, in order to obtain the desired dye-receptive NVM copolymer-containing product.

In this connection, when it is desired to blend the dye-assisting NVM copolymer adjuvant in synthetic polymer fiber-forming solution prior to its extrusion, such as an aqueous saline acrylonitrile polymer solution, the water-insoluble NVM copolymer may be physically reduced by comminution to a sufficiently fine state to permit its dispersion in spinnable condition throughout the blended spinning solution in the event that it is otherwise insoluble in the solvent. While this may be accomplished by diverse techniques, it is generally advantageous to comminute the NVM copolymer in the presence of the non-dissolving solvent, such as an aqueous saline polyacrylonitrile solvent, to form a stable suspension that may be more conveniently blended with the spinning solution of the synthetic polymer, such as an aqueous saline acrylonitrile polymer spinning solution. Thus, if an aqueous saline polyacrylonitrile solvent that is being employed is an aqueous solution of zinc chloride or its equivalent that contains at least about 55 percent and preferably about 60 percent by weight of dissolved zinc chloride, it is generally advantageous to comminute the NVM copolymer while it is in a mixture with the saline solvent solution that contains between about 5 and 10 percent by weight of the NVM copolymer. Analogous procedures may be employed when other solvents are involved. Ball or rod mills may be employed beneficially for the comminution. It is generally beneficial under such circumstances to avoid the use of balls or rods that are made of metal since they may contaminate the product, especially when aqueous saline solvents are utilized. Porcelain or other ceramic parts may usually be employed with advantage. A stable suspension of the NVM copolymer in the synthetic polymer solvent that is suitable for blending in the spinning solution of the synthetic polymer to provide a spinnable composition may usually be obtained by milling the mixture of NVM copolymer and solvent for an extended period that may exceed 100 hours. The suspension that is thereby obtained may then be directly blended in the proper proportions with the synthetic polymer spinning solution to provide a composition in accordance with the present invention.

The improved synthetic, linear, hydrophobic polymer compositions of the present invention, particularly acrylonitrile polymer compositions, may advantageously contain between about 2 and 15 percent by weight of the water-insoluble dye-assisting NVM copolymer, based on the total weight of polymer in the composition. More advantageously, they may contain at least about 4 to 10 percent by weight of the dye-assisting adjuvant. The desired concentration of the NVM copolymer may, as indicated, be obtained readily by blending a spinnable dispersion of the dye-assisting polymer with a fiber-forming synthetic polymer or by impregnating a shaped synthetic polymer composition while it is in a swollen or gel condition, as an acrylonitrile polymer composition in an aquagel condition. When a spinnable synthetic polymer composition containing the dispersed NVM copolymer is provided, particularly a spinnable acrylonitrile polymer composition, it is beneficial for the proportion of total polymeric material in the acrylonitrile polymer solvent to be about 10 percent by weight, based on the weight of the composition.

As has been indicated, the invention may advantageously be practiced with any synthetic, linear, hydrophobic polymer composition and is especially desirable for practice with fiber-forming compositions. Thus, by way of further illustration, compositions comprised of or containing acrylontrile polymers, synthetic, linear polyamides (such as the various nylon polymers including the condensation product of hexamethylene diamine and adipic acid known as nylon "66" and that of epsilon caprolactam known as nylon "6"), polyesters (including the condensation product of terephthalic acid and ethylene and the like glycols), polyolefins (including polyethylene and polypropylene) and the like may be employed. Great advantage may be realized when an acrylonitrile polymer composition is utilized, especially when it comprises a polymer that contains at least about 85 percent by weight of acrylonitrile polymerized in its molecule and particularly when it is comprised substantially or completely of polyacrylonitrile.

The improved dye-receptive acrylonitrile polymer compositions of the present invention and shaped articles fabricated therefrom, particularly those prepared with VM copolymers, have the capacity to accept and retain many of a wide variety of dyestuffs, including acetate, direct, vat and acid dyes. It is greatly preferred, incidentally, to characterize N-vinyl-3-morpholinone polymer-containing acrylonitrile polymer synthetic textile fibers as being members of the "nitrile alloy" class of fibers in order to clearly distinguish them from the conventional prototype acrylonitrile polymer fibers, especially the acrylonitrile copolymer varieties that are known to the art and which are oftentimes referred to and known as "acrylic" fibers.

Further features and advantages of the invention are apparent in the following illustrative examples which are not intended to limit or restrict the invention and in which, unless otherwise indicated, all parts and percentages are to be taken by weight.

EXAMPLE I

About 20 parts of N,N'-methlenebisacrylamide and 20 parts of VM were dissolved in 160 parts of water to which mixture there was added about 0.8 part of potassium persulfate. The resulting mixture was then adjusted to a pH of about 6 with ammonium hydroxide, then polymerized at about 50° C. for 16 hours to obtain a cross-linked, water-insoluble copolymer product containing about 40 percent of VM and 60 percent of the cross-linking monomer therein. About 73 percent of the charged monomeric ingredients were recovered as a white, cross-linked, water and organic solvent-insoluble copolymeric product. The copolymeric product was an excellent dye-assisting adjuvant when incorporated in polymer compositions in the manner described in the fourth and fifth examples.

EXAMPLE II

Four water-insoluble copolymers were prepared by copolymerizing mixtures of VM and tetraethyleneglycol dimethacrylate at 50° C. for 24 hours using 160 parts of water and 0.4 part of α,α'-azobisisobutyronitrile as a catalyst in each of the polymerization masses which had all been adjusted to a pH of 6 prior to commencement of the polymerization. The charges and results are set forth in the following tabulation:

| Charge | Run 2a | Run 2b | Run 2c | Run 2d |
| --- | --- | --- | --- | --- |
| Polyfunctional monomer_____parts___ | 4 | 8 | 20 | 32 |
| VM_____do____ | 36 | 32 | 20 | 8 |
| Insoluble copolymer_____do____ | 7 | 11 | 25 | 34 |
| Insoluble copolymer, percent_____ | 16.3 | 28.2 | 62.0 | 84.5 |

Each of the copolymer products, when incorporated in difficult to dye polymer compositions, such as polyacrylonitrile, were found to be excellent dye-assisting adjuvants therefor.

EXAMPLE III

Analogous excellent results were achieved when the procedures of Examples I and II were duplicated excepting to employ 2,4-diallyloxy-6-amino-5-triazine and diallyl glycerol as the polyfunctional monomers for the copolymer product. Commensurate good results are also obtained when the same procedures are followed excepting to utilize N-vinyl-5-methyl-3-morpholinone as the NVM monomer.

EXAMPLE IV

About 9 parts of the copolymer product of Example I that had been comminuted by mechanical means to a very fine particle size were blended with a solution of 81 parts of fiber-forming polyacrylonitrile in 737 parts of a 60 percent aqueous solution of zinc chloride. Films were cast of the resulting composition, washed thoroughly with water, then dyed. Their receptivity of Calcodur Pink 2BL, a direct dyestuff (Color Index 353) was found to be excellent. Their reflectance values, as described in the following Example V, were in the neighborhood of 18.

EXAMPLE V

The blended mixture of Example IV is wet spun according to a conventional procedure through a 306 hole spinnerette having individual round orifices that are about 0.010 inch in diameter into an aqueous zinc chloride-containing coagulating bath. After being oriented by stretching and dried, the resulting 2.5 denier fibers are found to have a tenacity of about 2.5 grams per denier, a dry yield of about 0.95 gram per denier and an elongation of about 44 percent. The fibers dye readily with Amacel Scarlet BS, Calcodur Pink 2BL, Calcocid Alizarine Violet and Xylene Milling Black.

When the finished fibers are subjected to a standard scouring procedure in a strong, aqueous detergent solution at the boil, only about 1.5 percent of the copolymer, based on the amount of copolymer present in the composition, is found to be removed. In comparison, polyacrylonitrile fibers that contain an equivalent amount of conventional homopolymeric poly-N-vinyl-3-morpholinone that has been incorporated in the fiber by impregnation while it is in an aquagel condition are frequently observed to lose as much as 20 to 30 percent of the homopolymer upon scouring under similar conditions.

The product fibers are dyeable with a great diversity of dyestuffs. When a sample of the fibers are dyed with 4 percent Calcodur Pink 2BL, they are found to have a reflectance value of about 16, indicating a deeply dyed product. The reflectance value of a dyed fiber is a spectrophotometrically measurable indication of its dye-receptivity since it indicates the amount of monochromatic light from a standard source having a wave length of about 520 millimicrons that is reflected from a dyed sample. The foregoing numerical reflectance value represents the relative comparison of the amount of light that is reflected from the dyed sample with that which is reflected from a standard white tile reflector having an arbitrarily assigned reflectance value of 316. Lower reflectance values are an indication of better dye-receptivity in the fiber. By way of illustration, a reflectance value of about 25 for fibers from acrylonitrile polymer compositions that are dyed with 4 percent Calcodur Pink 2BL is generally considered by those skilled in the art to represent a degree of dye-receptivity that readily meets or exceeds the most rigorous practical requirements and is ordinarily assured of receiving general commercial acceptance and approval. Frequently a reflectance value as high as 30–40 may be satisfactory for many purposes.

EXAMPLE VI

About 10 parts of a synthetic, linear polyamide fiber-forming material of the type known as nylon "66" and 1 part of a dry water-insoluble copolymer containing about 90 percent of VM and 10 percent of methylene-bis-acrylamide copolymerized in its molecule are comminuted to have an average particle size finer than 300 mesh in the U.S. Sieve Series. They are then intimately blended and the resulting mixture, with the copolymer in dispersion, is subsequently melt spun at 275° C. through a round orifice having a diameter of about 1 millimeter. The resulting fibers, after being cold stretched to a length about 2½ times their original extruded length, have good physical properties and excellent affinity for dyestuffs, including Calcodur Pink 2BL. As in the acrylonitrile polymer fibers illustrated in the preceding example, the nylon fibers containing the VM copolymer as a dye-assisting adjuvant are exceptionally resistant to losing the incorporated copolymer upon scouring.

EXAMPLE VII

The procedure of Example VI is repeated excepting to blend the dye-receptive, water-insoluble copolymer in an isotactic, fiber-forming polypropylene having a melting point between about 160 and 165° C. and melt spinning the blended composition at a temperature of about 225° C. The VM copolymer-containing polypropylene fibers have good physical properties and are extremely dye-receptive. Likewise, they retain the incorporated dye-assisting adjuvant almost completely despite repeated severe scourings.

Results similar to the foregoing may also be obtained when NVM copolymers are incorporated as dye-assisting adjuvants in other acrylonitrile polymer and polyamide compositions, various polyester compositions, other polyolefins, including polyethylene and in other synthetic polymers such as haloethylene polymer compositions including the various sarans and the like.

Certain changes and modifications in the practice of the present invention can be readily entered into without substantially departing from its intended spirit and scope. As a consequence, it is to be fully understood that the invention is not to be considered as being limited or in any way restricted to or by the preferred deictic embodiments thereof which are included in the foregoing description and specification. Rather, it is to be interpreted and construed in the light of what is set forth and defined in the hereto appended claims.

What is claimed is:

1. Dye-receptive composition which comprises a synthetic, resinous linear, hydrophobic fiber-forming polymer in which there is incorporated between about 2 and 15 percent by weight, based on the total weight of polymeric material in the composition, of a cross-linked, water-insoluble copolymer of (1) a polyfunctional monomer that contains at least two functional, polymerizable, ethylenically unsaturated groups and which is copolymerizable with an N-vinyl-3-morpholinone monomer of the Formula I and (2) an N-vinyl-3-morpholinone monomer of the structure:

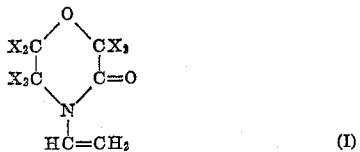

wherein each X is independently selected from the group consisting of hydrogen, alkyl radicals containing from 1 to about 4 carbon atoms, and aryl radicals containing from 6 to about 10 carbon atoms.

2. The composition of claim 1, wherein the synthetic polymer is a polyamide.
3. The composition of claim 1, wherein the synthetic polymer is a polyester.
4. The composition of claim 1, wherein the synthetic polymer is a polyolefin.
5. The composition of claim 1, wherein the synthetic polymer is an acrylonitrile polymer.
6. The composition of claim 5, in which there is uniformly incorporated from about 4 to 10 percent by weight of said copolymeric additament.
7. The composition of claim 5, wherein said copolymeric additament is comprised of N-vinyl-3-morpholinnone.
8. The composition of claim 5, wherein the copolymeric additament is comprised of a polyfunctional monomer selected from at least one of the members of the group consisting of diethylene-glycol-bis-allyl-carbonate, methylene-bis-acryl-amide, tetraethyleneglycol dimethacrylate, divinyl benzene, diallyl phthalate, diallyl glycerol, triallyl cyanurate, triacrylylperhydrotriazine, diallyl adipate, diallyl maleate, diallyl succinate, diallyl pentaerythritol, ethylenediacrylate and 1,5-pentadiene.
9. The composition of claim 5, wherein the vinyl lactam polymeric additament is comprised of a copolymer that contains a major proportion of a monomer of the Formula I polymerized in the copolymer molecule.
10. The composition of claim 5, wherein the copolymeric additament is comprised of a copolymer that contains between about 80 and 98 percent by weight of a monomer of the Formula I polymerized in the copolymer molecule.
11. The composition of claim 5, wherein the copolymeric additament is comprised of a copolymer that contains about 90 percent by weight of a monomer of the Formula I polymerized in the copolymer molecule.
12. A fiber-forming composition comprising the composition of claim 1.
13. The composition of claim 5 dispersed in spinnable condition in a solvent for polyacrylonitrile.
14. The composition of claim 13, wherein the solvent is an aqueous saline solution that is a solvent for polyacrylonitrile.
15. The composition of claim 14, wherein the aqueous saline polyacrylonitrile solvent is a zinc chloride solution that contains at least about 55 percent by weight of dissolved salt and in which there is dispersed in the neighborhood of 10 percent by weight of spinnable polymeric solids, based on the total weight of the composition and solvent.

16. A shaped filamentary article of the composition of claim 1.
17. Method for the preparation of a dye-receptive synthetic, resinous linear, hydrophobic fiber-forming polymer composition which comprises uniformly incorporating between about 2 and 15 percent by weight, based on the weight of the composition, of a cross-linked, water-insoluble polymeric additament in said synthetic polymer, said copolymeric additament being a copolymer of a monomer of the formula:

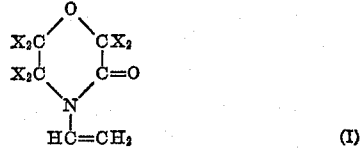

wherein each X is independently selected from the group consisting of hydrogen, alkyl radicals containing from 1 to about 4 carbon atoms, and aryl radicals containing from 6 to about 10 carbon atoms, and a polyfunctional monomer that contains at least two functional, polymerizable, ethylenically unsaturated groups and which is copolymerizable with a monomer of the Formula I.

18. Method for the preparation of a dye-receptive acrylonitrile polymer composition which comprises uniformly incorporating between about 2 and 15 percent by weight, based on the weight of the composition, of a cross-linked, water-insoluble copolymeric additament in said acrylonitrile polymer, said copolymeric additament being a copolymer of a monomer of the formula:

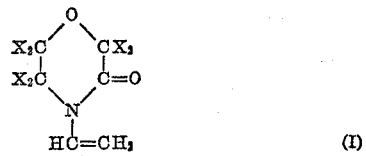

wherein each X is independently selected from the group consisting of hydrogen, alkyl radicals containing from 1 to about 4 carbon atoms, and aryl radicals containing from 6 to about 10 carbon atoms, and a polyfunctional monomer that contains at least two functional, polymerizable, ethylenically unsaturated groups and which is copolymerizable with a monomer of the Formula I.

19. The method of claim 18, wherein said copolymeric additament is incorporated in the acrylonitrile polymer composition by blending.
20. The method of claim 18, wherein said copolymeric additament is incorporated in the acrylonitrile polymer composition by impregnation of the latter with the former while the latter is in an aquagel condition.

References Cited in the file of this patent
UNITED STATES PATENTS

| | | |
|---|---|---|
| 2,231,905 | Hanford et al. | Feb. 18, 1941 |
| 2,643,990 | Ham | June 30, 1953 |
| 2,688,008 | Chaney | Aug. 31, 1954 |
| 2,771,468 | Surrey | Nov. 20, 1956 |
| 2,818,362 | Drechsel | Dec. 31, 1957 |